United States Patent [19]
Snyder et al.

[11] Patent Number: 5,857,908
[45] Date of Patent: Jan. 12, 1999

[54] DUCT STRUCTURE FOR A COTTON HARVESTER

[75] Inventors: Earl Richard Snyder, Davenport, Iowa; Timothy Allan Meeks, East Moline, Ill.; Michael J. Covington, Bettendorf, Iowa

[73] Assignee: Case Corporation, Racine, Wis.

[21] Appl. No.: 768,837

[22] Filed: Dec. 18, 1996

[51] Int. Cl.$^6$ .................................................. A01D 46/10
[52] U.S. Cl. ................................ 460/115; 460/119; 56/30
[58] Field of Search ..................... 460/119, 115, 460/23, 143; 56/30, 31, 32, 28

[56] References Cited

U.S. PATENT DOCUMENTS

| | | |
|---|---|---|
| 3,959,956 | 6/1976 | Fowler .......................................... 56/30 |
| 4,928,459 | 5/1990 | Thedford et al. . |
| 4,930,297 | 6/1990 | Schlueter et al. ........................ 56/16.6 |
| 4,930,299 | 6/1990 | McBee ........................................ 56/30 |
| 5,094,064 | 3/1992 | Thedford . |
| 5,527,218 | 6/1996 | Van den Bossche et al. ..... 460/119 X |

*Primary Examiner*—Terry Lee Melius
*Attorney, Agent, or Firm*—Mayer, Brown & Platt

[57] ABSTRACT

Cotton harvester multi-piece duct structure for conveying cotton materials between a cotton harvesting row unit, arranged toward a lower end of the duct structure, and an inlet opening of an extendable/retractable basket assembly. Toward an upper end thereof, the duct structure has a distal end operably connected to a remaining portion of the duct structure to allow the distal end of the duct structure to period between an operational position, wherein an outlet end of the duct structure is in general registry with the inlet opening to the basket assembly, and a storage position, wherein the distal end of the duct structure is lowered from the operational position to facilitate transportation of the cotton harvester. A lock mechanism is also disclosed for releasably fastening the distal end of the duct structure in an operational position relative to the remaining portion of the duct structure.

28 Claims, 7 Drawing Sheets

DUCT STRUCTURE FOR A COTTON HARVESTER

FIELD OF THE INVENTION

The present invention generally relates to cotton harvesters and, more particularly, to a cotton harvester having a basket assembly including an extendable/retractable upper basket portion and multi-piece duct structure movable between an operational position and a storage position

BACKGROUND OF THE INVENTION

Modern cotton harvesters typically include a relatively large high volume receptacle mounted to the frame of the harvester. Recently, the receptacle or basket assembly of cotton harvesters has been designed such that the height and, thus, the capacity of the basket assembly is adjustable. The receptacle or basket assembly on recent cotton harvester designs includes a lower basket portion mounted on the frame of the harvester with an upper basket portion being movably mounted and supported for elevational movement relative to the lower basket portion under the influence between an extended field working position and a retracted storage position.

A conventional cotton harvester further includes a plurality of harvesting row units arranged across a front end of the harvester. Each harvesting unit has duct structure operably associated therewith for receiving cotton materials harvested by the respective harvesting unit and for delivering the cotton materials into the receptacle. To optimize receptacle capacity, the cotton conveying structure extends upwardly from a respective harvesting row unit to a top forward portion of the upper basket portion of the receptacle wherein one or more openings are provided in registry with an exhaust end of the cotton conveying duct structure. To promote the delivery of cotton from the duct structure into the receptacle, the upper basket portion of the receptacle can include hood structure that extends vertically over and in operable combination with the discharge end of the duct structure.

Although beneficially increasing the capacity of the receptacle, maintaining the upper basket portion in an extended field working position presents certain problems and drawbacks. Because of shipping size limitations, the upper basket portion must be moved to its retracted storage position when the harvester is freighted by rail or truck. Because of power lines and the like, the increased height of the receptacle, with the upper basket portion in a raised field working position, makes it difficult to transport the harvester from one location to another. Moreover, the normal height of barn doors makes moving the harvester indoors for repairs or storage a problem because of the increased height added to the receptacle by the upper basket portion. Thus, and after the cotton materials are removed from the receptacle, the upper basket portion of the receptacle is lowered into its retracted position to facilitate transportation of the harvester.

While the height of the duct structure can exceed the height of the cab region, it is beneficial for transportation purposes to lower the height of the duct structure along with reducing the height of the receptacle. Some cotton harvesters have a plurality of duct structures extending upwardly toward the opening in the receptacle from each harvesting row unit. As will be appreciated, removing portions of each duct structure to reduce the height thereof is a labor intensive manual process. Reassembling each duct structure to return the machine to an operational condition also involves a labor intensive effort. A customer, for example, who desires to transport his cotton harvester from one location to the other must often spend a considerable number of man hours in tearing down and setting up the receptacle, thereby reducing the overall productivity of the harvester.

Thus, there is a need and a desire for a large capacity receptacle for a cotton harvester having arranged in combination therewith duct structure designed to accommodate shipping and transportation of the harvester and which obviates the need for tearing down and setting up the entire duct structure in response to the position of the upper basket portion of the receptacle.

SUMMARY OF THE INVENTION

In view of the above, and in accordance with the present invention, there is provided a cotton harvester having an extended frame and a relatively large capacity receptacle or basket assembly for receiving and holding cotton materials. The cotton harvester included a plurality of row units for removing cotton material from cotton plants as a harvester is driven across a field. The basket assembly is extendable to an increased size to enhance the material holding capacity thereof. On the other hand, the cotton basket assembly is retractable to a lowered position to facilitate transportation of the harvester. The basket assembly defines an inlet opening through which cotton materials are blown into the basket assembly when the basket assembly is in an extended position.

According to the present invention, multi-piece cotton elevating or duct structure conveys cotton materials from the harvesting units to an inlet opening of the basket assembly when the basket is in an extended or elevated position. A salient feature of the present invention concerns configuring the duct structure such that a distal end thereof is movable relative to a remaining portion of the duct structure. The distal end of the duct structure is movable between an operational position, wherein an outlet opening of the duct structure is in general registry with the inlet opening in the basket assembly, and a storage position, wherein the overall height of the duct structure is reduced, to facilitate transportation of the harvester.

The distal end of the duct structure is telescopically arranged along and about a free end of the remaining portion of the duct structure and is configured to promote pivotal movement therebetween. In the preferred form of the invention, the distal end of the elevating structure ranges between about 25% to about 37.5% of the overall length of the duct structure. The distal end of the duct structure is joined to the remaining portion of the duct structure for movement about a fixed axis extending generally parallel to the ground.

In a preferred form of the invention, the basket assembly includes lower and upper basket portions. The lower basket portion is mounted to the frame of the harvester. The upper basket portion is mounted on and supported by the lower basket portion for elevational telescoping movement relative to the lower basket portion. In the preferred form of the invention, the upper basket portion defines an inlet opening to the basket assembly through which cotton material is exhausted rearwardly from an opening in the distal end of the duct structure. In a preferred form of the invention, the distal end of the duct structure moves about a fixed pivot axis extending generally normal to the length of the frame. In a most preferred form of the invention, the pivot axis about which the distal end of the duct structure moves is elevationally disposed above the ground a distance generally equal to the distance a top edge of the lower basket portion of the basket assembly is elevationally disposed above the ground.

The duct structure preferably has generally parallel side walls and generally parallel front and rear walls joined to the side walls to define a generally rectangular structure extending for a major portion of the length of the duct structure. Moreover, the duct structure includes an air driven mechanism disposed in operable combination with a lower end portion of the remaining portion of the duct structure for drawing materials removed by the harvesting row units into the duct structure and for propelling the cotton materials toward the basket. Toward the upper end thereof, the basket assembly is provided with hood structure extending over and in operable combination with a distal end of the duct structure for facilitating transference of cotton materials into the inlet opening in the basket assembly.

The duct structure of the present invention further includes a lock mechanism for releasably fastening the distal end of the duct structure to the remaining portion of the elevating structure. In a preferred form of the invention, the lock mechanism includes a lock passing through adjacent walls of the distal end of the duct structure and the remaining portion of the duct structure for preventing relative movement therebetween as long as the lock is in a locked condition while allowing for relative movement therebetween when the lock is in a released position.

Moreover, in a preferred form of the invention, a mechanism is operably connected to the movable section of each duct structure for moving the distal ends of the duct structures conjointly relative to each other. Thus, all of the distal ends of the duct structure are movable between their operational and storage positions at the same time thereby reducing the effort and time spent to accomplish this result.

An advantage of the present invention concerns the ability to move the distal ends of the duct structure to a storage position after the basket assembly has been lowered to reduce the operational height of the harvester and promote its transportation from location to location. Another advantageous feature of the present invention is that the distal ends of the duct structure remain operably associated with the remaining portions of the duct structure thereby eliminating total disassembly of the duct structure thereby reducing the time spent on conditioning the machine for both operation and transport. Another salient feature of the present invention relates to the provision of a lock mechanism for releasably holding the distal ends of the duct structure in operational position relative to the remaining portion of the duct structure. Furthermore, in a preferred form, a mechanism is provided allowing for all of the distal ends of the duct structure to be conjointly moved relative to each other between either operational or storage positions thereby further reducing the manual effort to condition the harvester for either operation or transport.

These and other objects, features and advantages of the present invention will become readily apparent to those skilled in the art from the description which follows and from the drawings.

DETAILED DESCRIPTION OF A PREFERRED EMBODIMENT

While the present invention is susceptible of embodiment in various forms, there is shown in the drawings a presently preferred embodiment hereinafter described, with the understanding that the present disclosure is to be considered as an exemplification of the invention and is not intended to limit the invention to specific embodiment illustrate.

Figure 1:
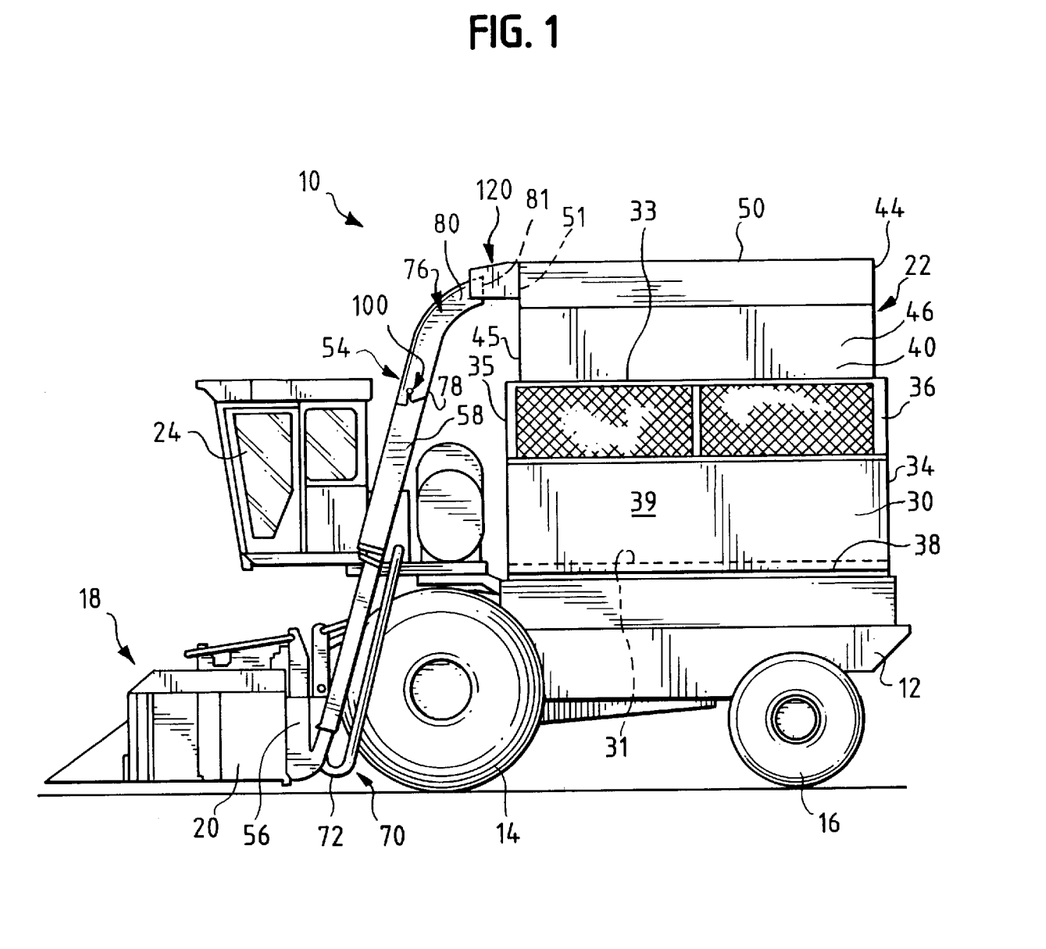
FIG. 1 is a side elevational view of a cotton harvester with duct structure according to the present invention arranged in combination with a basket assembly.
Figure 2:
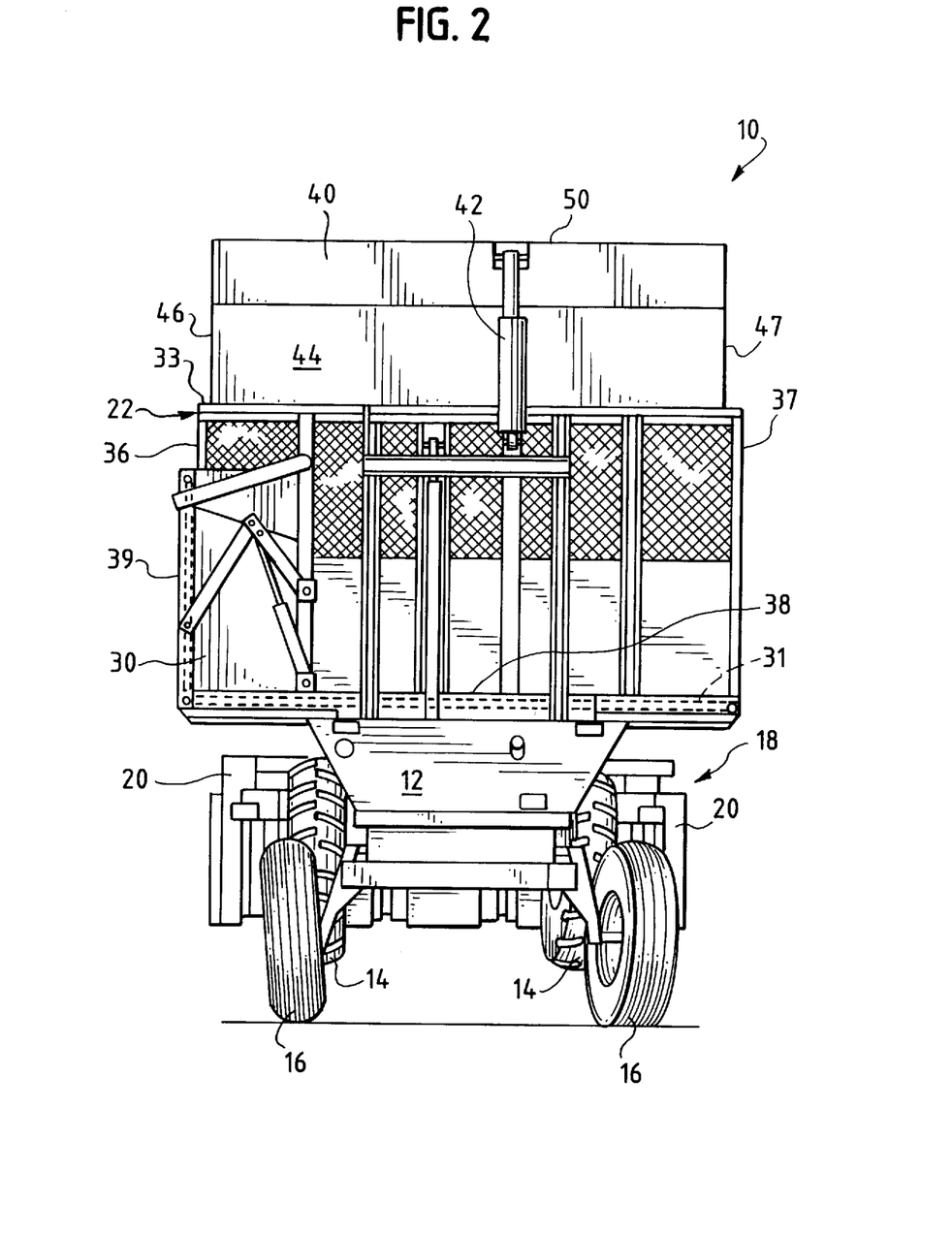
FIG. 2 is a rear perspective view of the cotton harvester illustrated in FIG. 1 with the basket assembly illustrated in an elevated field working position.

Referring now to the drawings, wherein like reference numerals refer to like parts throughout the several views, a cotton harvester is generally indicated in FIGS. 1 and 2 by reference numeral 10. Suffice it to say, the cotton harvester is of the type sold by Case Corporation of Racine, Wisconsin under Model No. 2500.

In the illustrated embodiment, harvester 10 includes a self-propelled frame 12 supported on a pair of front drive wheels 14 and pair of rear steerable wheels 16. Harvester 10 further includes, toward a front end thereof, harvesting structure 18 for removing cotton material from cotton plants as the harvester is driven across a field. In the illustrated embodiment, the harvesting structure 18 comprises a plurality of cotton harvesting row units 20 mounted across a front of the harvester 10 for picking or stripping cotton from rows of cotton plants as the harvester is driven through the field. As is conventional, the row units 20 are supported in side-by-side relation relative to each other across a front end of the harvester 10.

As shown, an extendible/retractable basket assembly or receptacle 22 is mounted on the frame 12 rearwardly of a driving compartment or cab 24. The compartment 24 is preferably configured as an enclosure for the operator and where the controls for o perating the harvester are located.

Figure 3:
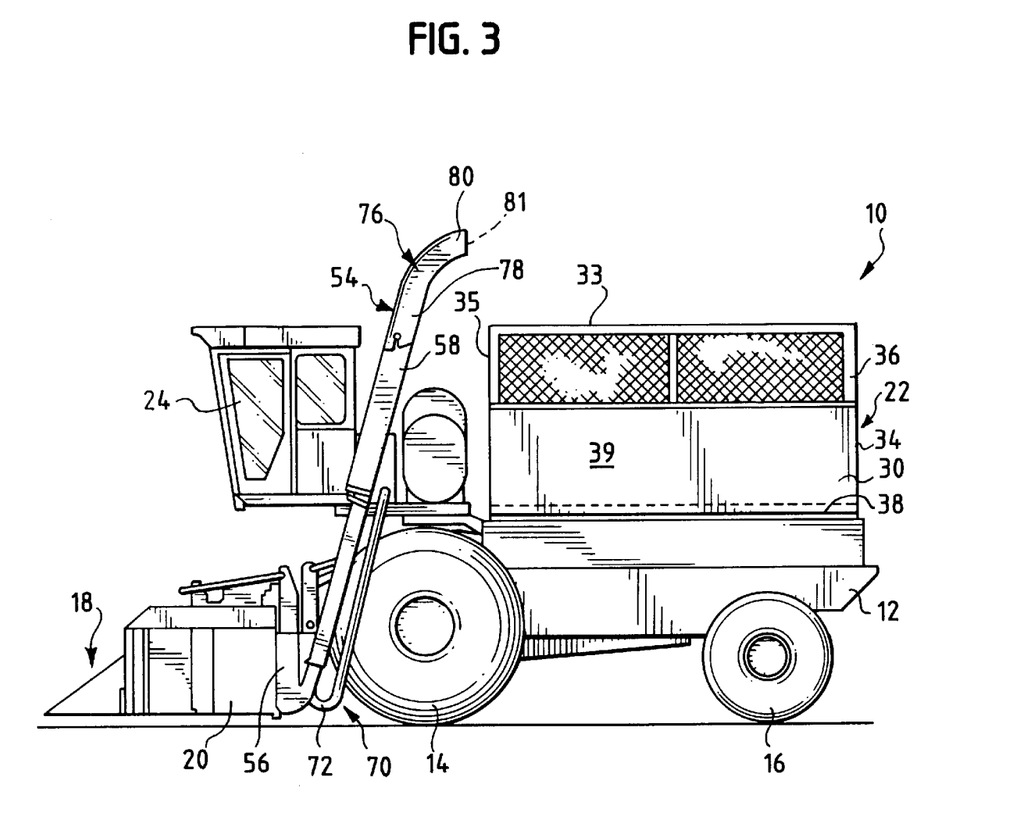
FIG. 3 is a side elevational view similar to FIG. 1 but showing an upper portion of the basket assembly in a retracted storage position.
Figure 4:
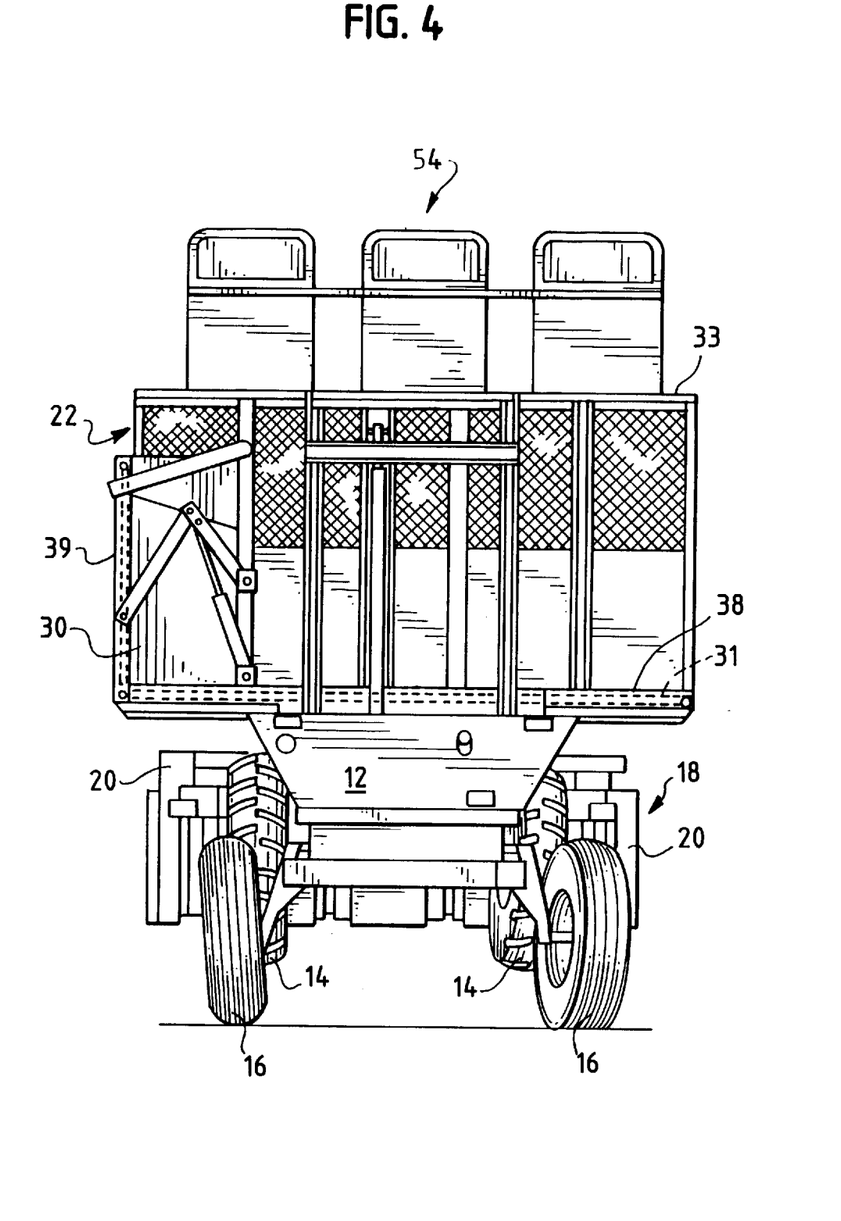
FIG. 4 is a rear perspective view similar to FIG. 2 but showing the upper basket portion of the basket assembly in a retracted storage position.

As shown in FIGS. 1 and 2, basket assembly 22 includes a lower basket portion 30 supported on and elevationally movable relative to frame 12 under the influence of front and rear preferably hydraulic basket lift cylinders 32 (with only the rear basket lift cylinder being shown in FIG. 2). The basket assembly 22 further includes an upper basket portion 40 telescopically received by the lower basket portion 30. Front and rear, preferably hydraulic, telescoping cylinders 42 (with only the rear telescoping cylinder being shown in FIG. 2) elevationally positions the upper basket portion 40 relative to the lower basket portion 30. As will be appreciated by those skilled in the art, the upper basket portion 40 elevationally moves between a raised or extended field working position (FIGS. 1 and 2) and a lowered storage or transport position (FIGS. 3 and 4).

When the upper basket portion 40 of basket assembly 22 is in an extended field working position (FIGS. 1 and 2) the cotton material holding capacity of the basket assembly 22 is substantially increased. When the cotton harvester 10 is to be driven from one field to another, or when placed for storage, the upper basket portion 40 of the basket assembly 22 is positioned in its lower position to significantly reduce the overall height of the harvester and advantageously lower its center of gravity.

The upper basket portion 40 of basket assembly 22 may further include a cotton compactor (not shown). Furthermore, the lower basket portion 30 of basket assembly 22 may include cotton unloading structure 31 for promoting discharge of cotton materials from the basket assembly 22.

In the illustrated form of the invention, the lower basket portion 30 of basket assembly 22 is a substantially rectangular open top structure having a top edge 33 disposed a predetermined distance above the ground over which the harvester moves. The lower basket portion 30 of basket assembly 22 further includes an aft end wall 34, a forward end wall 35, side walls 36 and 37 and floor structure 38. In the illustrated embodiment side wall 36 includes a hinged or pivotal door 39 movable between the closed position shown in the drawings and an open position. In its open position, door 39 allows cotton materials to be discharged from the basket assembly 22. In the preferred form of the invention, walls 34, 35, 36 and 37 of the lower basket portion 30 of receptacle 22 include, at least in part, metal screens fixedly supported on suitable frame work as well know in the industry.

The upper basket portion 40 of basket assembly 22 has a shape which generally corresponds to the shape of the interior of the lower basket portion 30 and is telescopically received in the lower basket portion 30 of basket assembly 22 for vertical movement with respect thereto between the extended or raised field working position (FIGS. 1 and 2) and the lowered transport position (FIGS. 3 and 4). The upper basket portion 40 includes a generally rectangularly shaped open bottom structure including an aft end wall 44, and forward end wall 45 and side walls 46 and 47. As is conventional, the walls 44, 45,46 and 47 of the upper basket portion 40 are formed, at least in part, from metal screens fixedly supported on suitable framework as is well know in the art.

The upper basket portion 40 of the basket assembly 22 further includes a top or cover structure 50 serving to prevent cotton materials blown into the basket assembly 22 from inadvertently escaping through the top of the basket assembly or receptacle 22. The upper basket portion 40 of the basket assembly 22 is provided with an inlet opening 51 defined toward the top of the forward or front wall 45 of the upper basket portion 40. In the preferred embodiment, a single inlet opening 51 is preferably defined by the basket assembly 22, it is likewise well within the spirit and scope of the present invention for the basket assembly 22 to define more than one inlet opening for allowing cotton materials to pass into the basket assembly 22.

Multi-piece cotton material elevating or duct structure, generally designated by reference numeral 54, is operatively associated with an upwardly extends from each harvesting row unit 20 of the harvesting structure 18 for conveying cotton materials to inlet opening 50 of the basket assembly. As is typical, and as shown in FIG. 4, the duct structure 54 may comprise more than one tube or conduit extending upwardly from the harvesting row units 20. In the illustrated embodiment, three elongated duct structures 54 lead toward and open to the inlet opening 51 in the basket assembly 22. It should be appreciated, however, that duct or elevating structures more or less in number from that shown for exemplary purposes are equally within the spirit and scope of the present invention. Moreover, since the duct structures are all substantially similar to each other, only one duct structure will be described in detail with the understanding that the other duct structures are substantially similar thereto.

Figure 5:
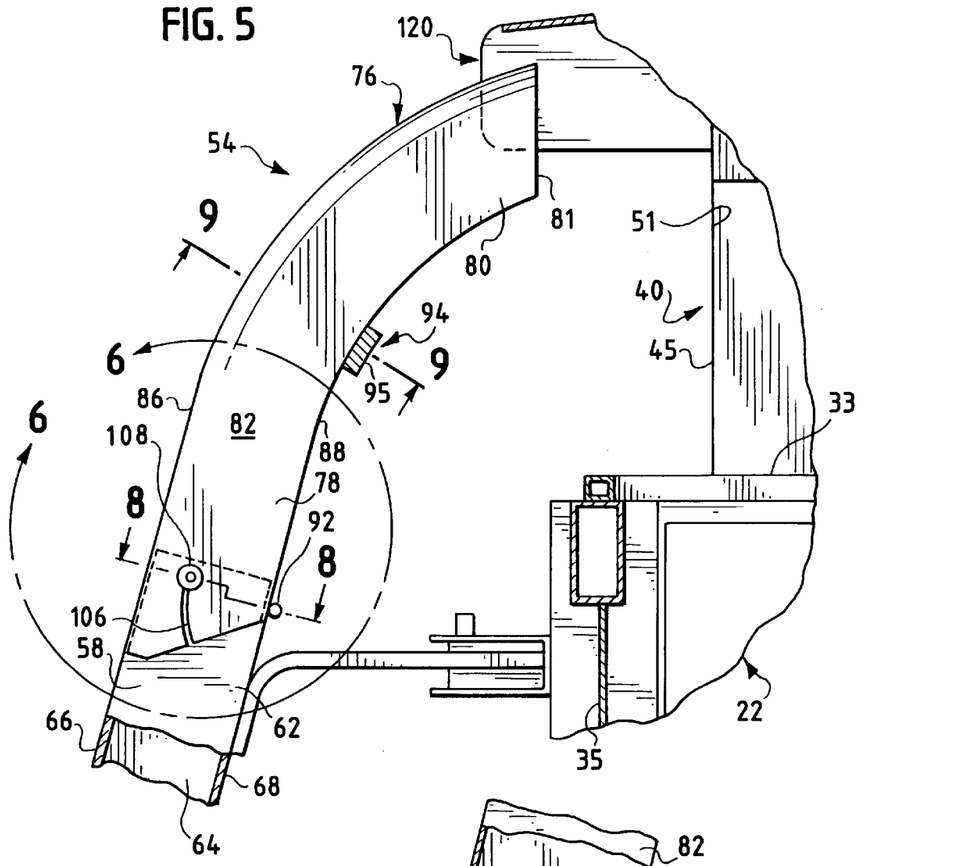
FIG. 5 is an enlarged fragmentary side elevational view of an distal end of a duct structure according to the present invention.
Figure 6:
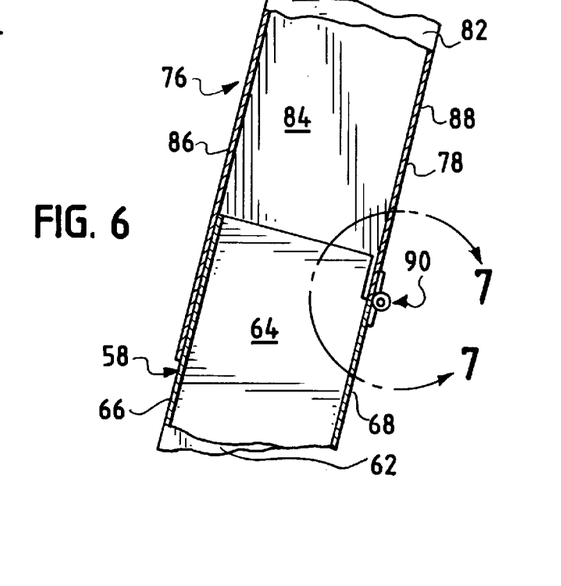
FIG. 6 is an enlarged view of the area encircled in FIG. 5.

As shown in FIGS. 1 and 3, toward a lower end thereof, each duct structure 54 defines a generally upright receiving station 56 for receiving cotton material from a respective harvesting row unit 20 of the harvesting structure 18. The receiving station 56 is operably connected in cotton conveying relation to a generally vertical tubular section 58 upwardly extending toward the inlet opening 51 of the basket assembly 22. In the preferred embodiment, and as shown in FIGS. 5 and 6, the vertical tube section 58 of duct structure 54 includes generally parallel side walls 62 and 64 rigidly joined to each other by generally parallel front and rear walls 66 and 68, respectively, thereby providing the duct structure with generally rectangular cross-sectional configuration for a majority of its length.

Returning to FIG. 1, each duct structure 54 further includes an air operated mechanism 70 disposed in operable combination with the tubular section 58 of each duct structure 54. The air operated mechanism 70 preferably includes an air nozzle 72 extending into the interior of the duct structure 54 and connected, in a conventional manner, to a source of air, such as a driven fan, suitably mounted on the frame 12 of the harvester 10. As is well known in the art, during cotton harvester operation, the air operated mechanism 70 serves to direct a stream of pressurized air upwardly through the duct structure 54 thereby drawing cotton materials removed by the harvesting row unit into the receiving station 56 and, ultimately, propelling the cotton materials through the duct structure and upwardly toward the inlet opening 51 of the basket assembly 22.

According to the present invention, each multi-piece duct structure 54 further includes a distal end portion 76 movably joined to the remaining or vertically tubular section 58 of the duct structure 54. In the preferred form of the invention, the distal end portion 76 of each duct structure 54 comprises about 25% to about 37.5% of the total vertical length of the duct structure 54 measuring from the ground upward.

Figures 7, 8, 10:
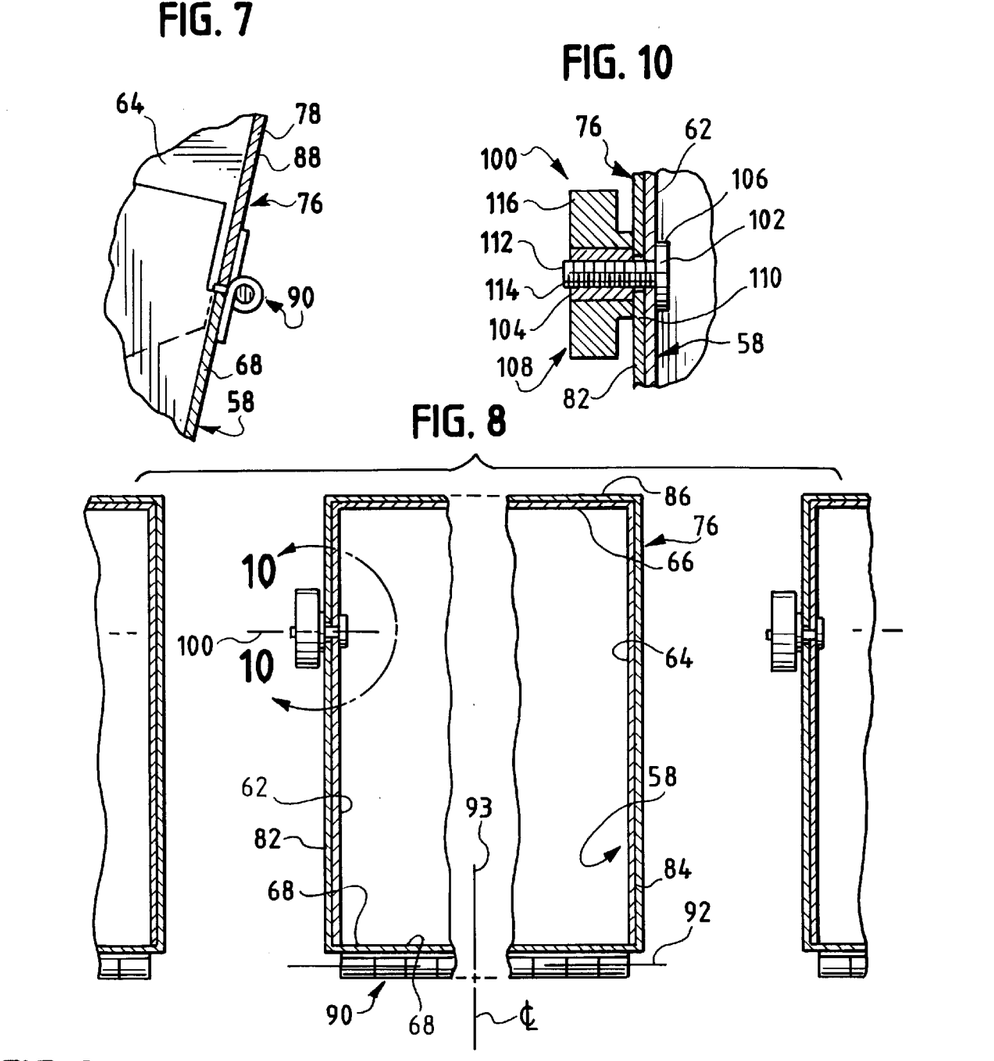
FIG. 7 is an enlarged view of the area encircled in FIG. 6.
FIG. 8 is a sectional view taken along line 8—8 of FIG. 5.
FIG. 10 is an enlarged view of the area encircled in FIG. 8.

As shown in the drawings, the distal end 76 of each duct structure 54 preferably has a rearwardly directed curvilinear configuration with a lower end section 78 being joined to the upper free end of the tubular portion 58 and an upper end section 80 defining an outlet 81 from whence cotton materials are directed. As shown in FIGS. 5, 6 and 8, the lower end section 78 of the distal end 76 of each duct structure has a shape generally corresponding to the shape of the free end of the tubular portion 58 to permit pivotal and telescoping movement therebetween. The distal end 76 of duct structure includes side walls 82 and 84, a forward or front wall 86 and a rear wall 88. Notably, the rear wall 68 of the remaining duct structure 58 and the rear wall 88 of the distal end 76 of the duct structure 54 are suitably configured to permit pivotal movement of the distal end 76 relative to the remaining tubular portion 58 without causing binding therebetween.

As shown in FIGS. 6 and 7, a hinge assembly 90 operably interconnects the lower end section 78 of the distal end 76 to the upper free end of the remaining portion or tubular structure 58 to allow for telescopic and pivotal movement of the distal end 76 between an operational position (FIG. 1) and a lowered storage position (FIG. 10). Turning to FIG. 8, hinge assembly 90 defines a pivot axis 92 about which the distal end 76 pivots relative to the remaining portion 58 of the duct structure 54. Notably, in a preferred form of the invention, axis 92 extends generally parallel to the ground and generally perpendicular to longitudinal axis 93 of the machine 10. Moreover, the pivot axis 92, about which the distal end 76 of the duct structure 54 moves, is elevationally disposed above the ground by a distance about equal to the distance the upper edge 33 of the lower basket portion 30 of basket assembly 22 is disposed above the ground.

Figure 9:
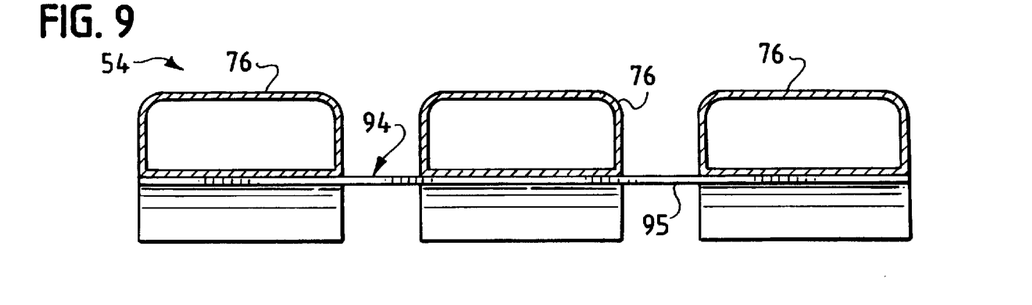
FIG. 9 is a sectional view taken along line 9—9 of FIG. 5.

As shown in FIGS. 5 and 9, a preferred form of the present invention further includes a mechanism 94 for conjointly moving the distal end portion 76 of all the duct structures 54 between their operational position (FIG. 1) and their retracted position (FIG. 10). In the illustrated form of the invention, mechanism 94 comprises an elongated bar 95 secured to and extending across thereby interconnecting the distal end portions 76 of the duct structure 54 extending toward the upper end of the basket assembly 52. Alternatively, a powered driver can be interconnected to each distal end 76 of each duct structure for automatically moving the distal end portion 76 between operational and retracted positions. In still another form, a powered driver can be interconnected to all of the distal end portions 76 of the various duct structures to effect movement of all the distal end portion 76 in conjointly timed relation relative to each other.

Another feature of the present invention relates to a lock mechanism 100 for fastening and releasably holding the distal end 76 of the duct structure to the remaining portion 58 as long as the lock mechanism 100 is in a locked condition and for allowing relative movement between the distal end 76 and the remaining portion 58 of the duct structure when the lock mechanism 100 is in a released condition. As shown in FIG. 10, one form of the lock mechanism 100 preferably includes an elongated member 102 non-rotatably secured and extending outwardly from the side wall 62 of the tubular section 58. Notably, member 102 has external threading 104 extending axially therealong for a distance extending inwardly from a free end thereof. Member 102 extends endwise through an elongated slot 106 formed in wall 82 of the respective distal end 76 of duct structure 54.

Figure 11:
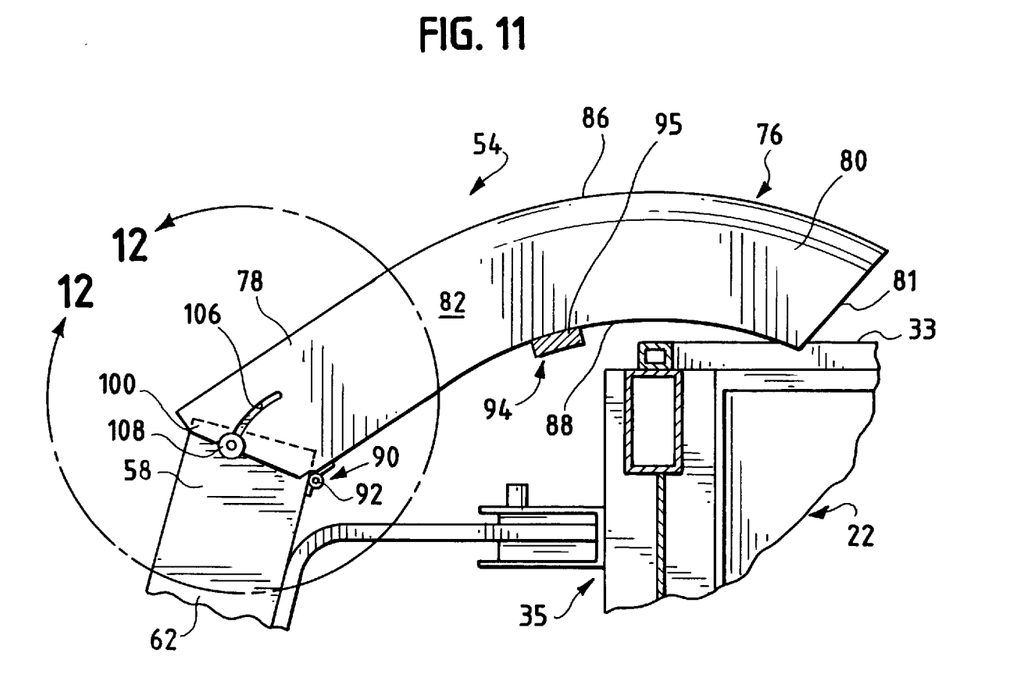
FIG. 11 is an enlarged view similar to FIG. 5 showing the distal end of a duct structure tilted rearwardly to a storage position.

In the illustrated embodiment, and as shown in FIGS. 5 and 11, slot 106 has an arcuate configuration arranged concentrically relative to the pivot axis 92 of hinge assembly 90. Moreover, in the illustrated form of the invention, slot 106 has an open bottom or lower end to allow for maximum movement of the distal end 76 of structure 54. In the illustrated form of the invention, the locking mechanism 100 is disposed to one side of the duct structure 54. It is well within the spirit and scope of the present invention, however, to arrange the lock mechanism 100 on any of the other walls of the duct structure 54 without detracting or departing from the spirit and scope of the present invention.

Lock mechanism 100 further includes a manually operated knob 108 for controlling the lock mechanism 100 between locked and unlocked conditions. As illustrated in FIG. 10, knob 108 includes a shank portion 110 having a diameter greater than the width of slot 106 and defining a throughbore 112 with internal threading 114 extending therealong. An enlarged handle portion 116 is joined to and radially extends from the shank portion 110. As will be appreciated, rotation of the knob 108 in a first direction draws or pulls the wall 62 of tubular section 58 into a compressive relationship relative to wall 82 of the distal portion 76 thereby inhibiting relative movement therebetween as a result of the friction fit between walls 62 and 82. When the knob 108 is sufficiently turned in an opposite direction, the friction fit between walls 62 and 82 of tubular section 58 and distal end 76, respectively, is reduced thereby allowing for pivotal movement of the distal end 76 relative to the respective tubular section 58.

To optimize filling of the receptacle or basket assembly 22, efficient and effective transfer of cotton materials from the duct structure 54 into and through the inlet opening 51 in the basket assembly 22 is important. In this regard, and as shown in FIG. 5, the basket assembly 22 preferably includes hood structure 120 extending over and in operable combination with the distal end 76 of each duct structure 54 to direct harvested cotton materials to the inlet opening 50 of the basket assembly 22. In the preferred form of the invention, the hood structure 120 is mounted on the upper basket portion 40 of the basket assembly 22. In a most preferred form of the invention, the hood structure 120 is movable between extended and retracted positions and is of the type disclosed in copending and coassigned U.S. patent application Ser. No. 08/438,783 filed May 11, 1995; the full disclosure of which is incorporated herein by reference.

During operation of the harvester 10, and as best shown in FIG. 1, when the upper basket portion 40 of the basket assembly 22 is in an extended or field working position to maximize capacity of the receptacle or basket assembly 22, the distal end 76 of each duct structure 54 is positioned relative to the remaining portion 58 to direct cotton materials into and through the inlet opening 51 of the basket assembly 22. Lock mechanism 100 associated with the duct structure 54 serves to maintain the distal end 76 of each duct structure in position relative to the remaining portion 58.

To facilitate transportation of the harvester 10, the upper basket portion 40 is lowered to a retracted or stored position, as shown in FIGS. 3 and 4. With the upper basket portion 40 of basket assembly 22 in a retracted or stored position, the height of the duct structure 54 can exceed the desired transportation height of the harvester. The rearwardly curved or slanted configuration of the distal end 76 of the duct structure 54 allow power lines and/or telephone lines to slidably move along and, ultimately, thereover.

Figure 12:
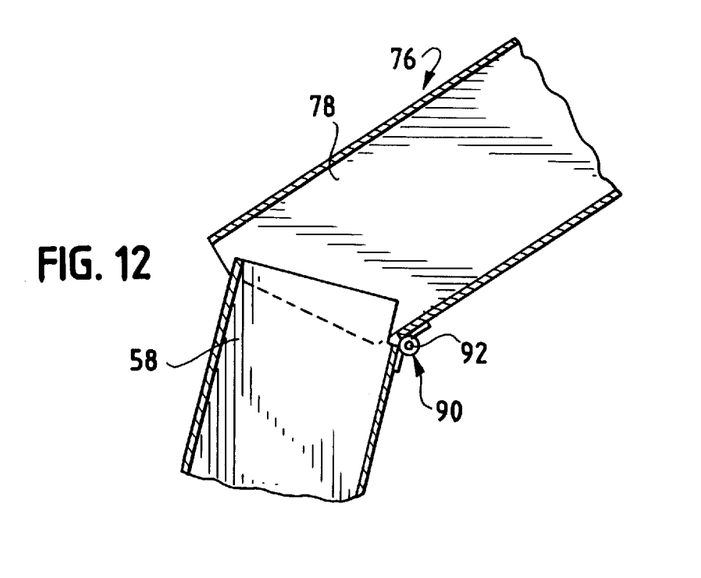
FIG. 12 is a longitudinal sectional view showing the relationship of the distal end of the duct structure relative to a remaining portion of the duct structure when the distal end is tilted rearwardly to a storage position.

According to the present invention, however, the duct structure 54 of the cotton harvester is configured such that the distal end 76 of each duct structure 54 can be moved from its operational position shown in FIGS. 1 and 3 to a storage position as shown in FIGS. 11 and 12. To move the distal end 76 of each duct structure 54 to its laid back or retracted position, the lock mechanism 100 is conditioned to allow relative movement of the distal end 76 of the duct structure 54 relative to the remaining tubular section 58. Thereafter, the distal end 76 can be rotated about the pivot axis 92 into a storage position while remaining operably interconnected to the tubular section 58. Notably, when the distal end 76 is in a storage position, the overall height of the harvester 10 is reduced thereby advantageously lowering the center of gravity and promoting transportation of the harvester. Moreover, mechanism 94 allows all of the distal ends 76 of the duct structure 54 to be conjointly moved relative to each other if so desired.

To return the harvester to its operating condition, the distal end 76 of each duct structure 54 is rotated about its axis 92 thereby allowing portion 78 to move telescopically about and along the free end of the tubular section 58. In this regard, the length of slot 106 of lock mechanism 100 acts as a limit stop thereby controlling the degree of pivotal movement of the distal end 76 relative to the remaining portion. After moving the distal end 76 relative to the remaining duct structure 58, the lock mechanism 100 is conditioned to releasably secure the distal end 76 relative to the remaining duct structure 58. As will be appreciated, mechanism 94 may used to facilitate movement of the distal ends 76 in combination relative to each other, thereby reducing the time required to condition the duct structure 54.

From the foregoing, it will be observed that numerous modifications and variations can be effected without departing from the true spirit and scope of the novel concept of the present invention. It will be appreciated that present disclosure is intended as an exemplification of the invention, and is not intended to limit the invention to the specific embodiment illustrated. The disclosure is intended to cover by the appended claims all such modifications as fall within the scope of the claims.

What is claimed is:

1. A cotton harvester comprising a mobile frame, harvesting structure to remove cotton material from cotton plants as the harvester is driven across a field, a basket to receive and hold the cotton material removed by said harvesting structure, said basket including a lower basket portion mounted on the frame and an upper basket portion telescopically received by the lower basket portion for elevational movement between an elevated field working position and a retracted position, with said upper basket portion defining an inlet opening for said basket through which cotton materials enter said basket, and a multi-piece cotton elevating structure to convey cotton material from said harvesting structure to said inlet opening, when said upper basket portion is in a field working position, and with a distal end portion of said elevating structure being pivotal about a fixed generally horizontal axis relative to a remaining portion of said elevating structure, when said upper basket portion is in said retracted position, to reduce the overall height of the harvester and thereby promote transportation of the harvester.

2. The cotton harvester according to claim 1 wherein said elevating structure further includes an air operated mechanism disposed in operable combination with the remaining portion of said elevating structure to draw cotton materials removed by said harvesting structure into said elevating structure and to propel said cotton material toward said basket.

3. The cotton harvester according to claim 1 wherein the elevating structure has a generally rectangular cross-sectional configuration extending a major length from the outlet end thereof.

4. The cotton harvester according to claim 1 wherein a section of the distal end portion of said elevating structure is telescopically arranged along and about a free end of the remaining portion of the elevating structure and is joined by a hinge for pivotal movement therebetween.

5. The cotton harvester according to claim 1 wherein the distal end portion of said elevating structure has a curvilinear configuration extending in a rearward direction of the harvester.

6. The cotton harvester according to claim 1 further including a lock mechanism to secure releasably the position of the distal end portion of said elevating structure relative to the remaining portion of said elevating structure.

7. The cotton harvester according to claim 6, wherein the lock mechanism includes a fastener extending from one of the portions of the elevating structure and an elongate slot defined in the other of the portions of the elevating structure, the elongate slot having a shape corresponding to the path of movement of the distal end portion of the elevating structure about the fixed generally horizontal axis and the fastener being received by the slot to guide the movement of the distal end portion.

8. The cotton harvester according to claim 1 wherein the upper basket portion of said basket includes a hood structure extending over and in operable combination with the distal end portion of said elevating structure.

9. A cotton harvester comprising an extended frame, a harvesting structure to remove cotton material from cotton plants as the harvester is driven across a field, an extendable/retractable basket assembly to receive and hold the cotton material removed by said harvesting structure, said basket assembly defining an inlet opening through which cotton materials enter said basket assembly when said basket assembly is in an extended position, and a multi-piece cotton elevating structure to convey cotton material from said harvesting structure to said inlet opening, said elevating structure including a distal end duct portion operably interconnected to a remaining portion of said elevating structure to allow said distal end duct portion to pivot about a fixed generally horizontal axis between an operational position, wherein an outlet end of said elevating structure is disposed in general registry with the inlet opening of said basket assembly, and a storage position, wherein the distal end duct portion is lowered from the operational position to promote transportation of the harvester.

10. The cotton harvester according to claim 9 wherein the distal end duct portion of said elevating structure has a length ranging between about 25% to about 37.5% of an overall length of said elevating structure.

11. The cotton harvester according to claim 9 wherein the generally horizontal axis about which the distal end duct portion of said elevating structure pivots relative to the remaining portion of the elevating structure extends generally transverse to the length of said frame.

12. The cotton harvester according to claim 9 wherein said elevating structure further includes an air operated apparatus disposed in operable combination with the remaining portion of said elevating structure to draw cotton materials removed by said harvesting structure into said elevating structure and to propel said cotton material toward said basket assembly.

13. The cotton harvester according to claim 9 wherein the distal end duct portion of said elevating structure has a pair of generally parallel side walls with front and rear walls joined to and extending between the side walls, and wherein a free end of the remaining portion of said elevating structure is complementarily configured to allow for a telescoping relationship to be established therebetween.

14. The cotton harvesting structure according to claim 13 further including a lock engaging adjacent walls of the distal end duct portion and the remaining portion of said elevating structure to prevent relative movement therebetween when said lock is engaged while allowing for relative movement therebetween when said lock is released.

15. The cotton harvester according to claim 9 wherein a lower section of the distal end duct portion of said elevating structure is telescopically arranged along and about a free end of the remaining portion of the elevating structure and is joined by a hinge for pivotal movement therebetween.

16. The cotton harvester according to claim 9 wherein the distal end duct portion of said elevating structure has a curvilinear configuration extending in a rearward direction of the harvester.

17. The cotton harvester according to claim 9 further including a lock to secure releasably the position of the distal end duct portion of said elevating structure relative to the remaining portion of said elevating structure.

18. The cotton harvester according to claim 17, wherein the lock includes a fastener extending from one of the portions of the elevating structure and an elongate slot defined in the other of the portions of the elevating structure, the elongate slot having a shape corresponding to the path of movement of the distal end duct portion of the elevating structure about the fixed generally horizontal axis and the fastener being received by the slot to guide the movement of the distal end duct portion.

19. A cotton harvester comprising a mobile frame, a plurality of harvesting units mounted at a forward end of said frame to remove cotton material from cotton plants as the harvester is driven across a field, an extendable/retractable basket assembly defining an inlet opening through which cotton material enters the basket assembly, and wherein each harvesting unit has arranged in operable combination therewith a multi-piece duct structure to direct cotton material from the respective harvesting unit to said inlet opening when said basket assembly is in an extended position, said multi-piece duct structure including a generally vertical section extending upwardly from the respective harvesting unit and a movable section disposed at a free end of said vertical section for movement between an operational position, wherein an outlet end of said movable section opens in a generally rearward direction toward the inlet opening, and a storage position, wherein the outlet end of said movable section is directed generally downwards, to reduce the overall height of the harvester thereby facilitating transportation thereof.

20. The cotton harvester according to claim 19 wherein said extendable/retractable basket assembly includes a lower basket portion mounted on the frame and an upper basket portion telescopically arranged for elevational movement relative to and supported by said lower basket portion between extended and retracted positions.

21. The cotton harvester according to claim 20 wherein the upper basket portion includes a hood structure extending over and in operable combination with the outlet end of the movable section of each duct structure to promote the delivery of the cotton materials from the duct structure into the basket assembly.

22. The cotton harvester according to claim 19 further including an air operated mechanism operably associated with a lower end of each multi-piece duct structure to draw cotton materials into the duct structure from the respective harvesting row unit and forcibly propel the cotton materials upwardly through the duct structure and out the outlet end thereof.

23. The cotton harvester according to claim 19 wherein the movable section of each duct structure has a curvilinear configuration between opposite ends thereof.

24. The cotton harvester according to claim 19 wherein said movable section is joined to said vertical section of each said duct structure by a hinge for pivotal movement of the movable section relative to the vertical section while maintaining an operable association therebetween.

25. The cotton harvester according to claim 19 wherein said movable section is joined to said vertical section of said duct structure along a pivot axis extending generally transverse to a longitudinal axis of the harvester.

26. The cotton harvester according to claim 19 wherein each multi-piece duct structure further includes a lock mechanism to secure releasably the position of said movable section relative the free end of said vertical section.

27. The cotton harvester according to claim 26, wherein the lock mechanism for each duct structure includes a fastener extending from one of the sections of the duct structure and an elongate slot defined in the other of the sections of the duct structure, the elongate slot having a shape corresponding to the path of movement of the movable section of the duct structure and the fastener being received by the slot to guide the movement of the movable section.

28. The cotton harvester according to claim 19 further including a mechanism operably connected to the movable section of each duct structure to move the movable sections of the duct structure conjointly relative to each other.

* * * * *